United States Patent
Oliver et al.

(10) Patent No.: US 10,039,174 B2
(45) Date of Patent: Jul. 31, 2018

(54) SYSTEMS AND METHODS FOR ACKNOWLEDGING BROADCAST MESSAGES IN A WIRELESS LIGHTING CONTROL NETWORK

(71) Applicant: RAB Lighting Inc., Northvale, NJ (US)

(72) Inventors: Jason Lawrence Oliver, Northvale, NJ (US); Frank Hubert Benetz, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 15/492,663

(22) Filed: Apr. 20, 2017

(65) Prior Publication Data

US 2017/0223809 A1    Aug. 3, 2017

Related U.S. Application Data

(63) Continuation-in-part of application No. 15/357,900, filed on Nov. 21, 2016, which is a
(Continued)

(51) Int. Cl.
*H05B 37/02* (2006.01)
*H05B 39/04* (2006.01)
(Continued)

(52) U.S. Cl.
CPC ..... *H05B 37/0272* (2013.01); *H04L 12/4625* (2013.01); *H04L 67/10* (2013.01);
(Continued)

(58) Field of Classification Search
None
See application file for complete search history.

(56) References Cited

U.S. PATENT DOCUMENTS 5,166,887 A    11/1992   Farrington et al.
5,283,905 A     2/1994   Saadeh
(Continued)

FOREIGN PATENT DOCUMENTS

CA    2236569    2/2006
CA    2249423    9/2010
(Continued)

OTHER PUBLICATIONS

"Altor Power for Electronics", Altor, Inc., brochure cover page, Natick, MA, circa 1997.
(Continued)

*Primary Examiner* — Anh Tran
(74) *Attorney, Agent, or Firm* — SmithAmundsen LLC; Dennis S. Schell; Kevin C. Oschman

(57) ABSTRACT

Embodiments of the present disclosure decrease conflicts between individual lighting devices in a wireless network when responding to a broadcast/multicast message sent to a group of devices. In some embodiments the devices delay sending their acknowledgment to commands until after a specific time period. Some embodiments limit the number of time delays to one of a predetermined number of time delays, where the number of time delays are assigned by an external source, such as the gateway. Still other embodiments include assigning each device one of a limited number of preset time delays, where the total number of preset time delays are less than the number of devices, for example, ten (10) percent of the number of devices (here some devices will have the same time delays as other devices). Still other embodiments use bitmaps to designating which one or more individual devices the message is intended for.

19 Claims, 4 Drawing Sheets

Related U.S. Application Data continuation-in-part of application No. 14/823,560, filed on Aug. 11, 2015, now Pat. No. 9,883,567.

(60) Provisional application No. 62/035,558, filed on Aug. 11, 2014, provisional application No. 62/257,908, filed on Nov. 20, 2015.

(51) Int. Cl.

| | |
|---|---|
| *H05B 41/36* | (2006.01) |
| *H04W 56/00* | (2009.01) |
| *H04L 12/46* | (2006.01) |
| *H04W 24/08* | (2009.01) |
| *H04L 29/08* | (2006.01) |
| *H04W 88/16* | (2009.01) |
| *H04W 84/18* | (2009.01) |
| *H04L 12/28* | (2006.01) |
| *H04W 12/06* | (2009.01) |

(52) U.S. Cl.
CPC ....... *H04W 24/08* (2013.01); *H04W 56/0045* (2013.01); *H05B 37/0281* (2013.01); *H04L 12/2803* (2013.01); *H04W 12/06* (2013.01); *H04W 84/18* (2013.01); *H04W 88/16* (2013.01)

(56) References Cited

U.S. PATENT DOCUMENTS

| | | |
|---|---|---|
| 5,357,361 A | 10/1994 | Nishizawa |
| 5,598,042 A | 1/1997 | Mix et al. |
| 5,623,172 A | 4/1997 | Zaretsky |
| 5,786,644 A | 7/1998 | Zaretsky |
| 5,905,442 A | 5/1999 | Mosebrook et al. |
| 5,909,429 A | 6/1999 | Satyanarayana et al. |
| 5,949,200 A | 9/1999 | Ference et al. |
| 5,982,103 A | 11/1999 | Mosebrook et al. |
| 6,005,759 A | 12/1999 | Hart et al. |
| 6,013,988 A | 1/2000 | Bucks et al. |
| 6,016,038 A | 1/2000 | Mueller et al. |
| 6,094,014 A | 7/2000 | Bucks et al. |
| 6,145,998 A | 11/2000 | Lynch et al. |
| 6,150,774 A | 11/2000 | Mueller et al. |
| 6,147,458 A | 12/2000 | Bucks et al. |
| 6,204,584 B1 | 3/2001 | Muszynski |
| 6,215,102 B1 | 4/2001 | Jones |
| 6,223,029 B1 | 4/2001 | Stenman et al. |
| 6,234,648 B1 | 5/2001 | Borner et al. |
| 6,250,774 B1 | 6/2001 | Begemann et al. |
| 6,252,358 B1 | 6/2001 | Xydis et al. |
| 6,264,329 B1 | 7/2001 | Brooks et al. |
| 6,275,163 B1 | 8/2001 | Bogorad et al. |
| 6,300,727 B1 | 10/2001 | Bryde et al. |
| 6,304,464 B1 | 10/2001 | Jacobs et al. |
| 6,340,864 B1 | 1/2002 | Wacyk |
| 6,388,399 B1 | 5/2002 | Eckel et al. |
| 6,421,214 B1 | 7/2002 | Packard et al. |
| 6,513,949 B1 | 2/2003 | Marshall et al. |
| 6,528,954 B1 | 3/2003 | Lys et al. |
| D475,126 S | 5/2003 | Bonne |
| 6,561,690 B2 | 5/2003 | Balestriero et al. |
| 6,577,512 B2 | 6/2003 | Tripathi et al. |
| 6,580,950 B1 | 6/2003 | Johnson et al. |
| 6,586,890 B2 | 7/2003 | Min et al. |
| 6,617,795 B2 | 9/2003 | Bruning |
| D481,016 S | 10/2003 | Hillis |
| 6,639,769 B2 | 10/2003 | Neiger et al. |
| 6,655,817 B2 | 12/2003 | Devlin et al. |
| 6,692,136 B2 | 2/2004 | Marshall et al. |
| 6,735,619 B1 | 5/2004 | Sawada |
| 6,788,011 B2 | 9/2004 | Mueller et al. |
| 6,798,341 B1 | 9/2004 | Eckel et al. |
| 6,806,659 B1 | 10/2004 | Mueller et al. |
| 6,807,035 B1 | 10/2004 | Baldwin et al. |
| 6,813,720 B2 | 11/2004 | Leblanc |
| D499,702 S | 12/2004 | Abe |
| 6,831,569 B2 | 12/2004 | Wang et al. |
| 6,844,807 B2 | 1/2005 | Inoue et al. |
| 6,922,022 B2 | 7/2005 | Johannes et al. |
| 6,930,598 B2 | 8/2005 | Weiss |
| 6,940,230 B2 | 9/2005 | Myron et al. |
| 6,950,725 B2 | 9/2005 | Von Kannewurff et al. |
| 6,963,285 B2 | 11/2005 | Fischer et al. |
| 6,967,448 B2 | 11/2005 | Morgan et al. |
| 6,969,954 B2 | 11/2005 | Lys |
| 6,972,525 B2 | 12/2005 | Johannes et al. |
| 6,975,079 B2 | 12/2005 | Lys et al. |
| 6,989,807 B2 | 1/2006 | Chiang |
| 6,990,349 B1 | 1/2006 | Pasternak |
| 6,990,394 B2 | 1/2006 | Pasternak |
| 7,030,572 B2 | 4/2006 | Bernard et al. |
| 7,038,399 B2 | 5/2006 | Lys et al. |
| 7,043,310 B2 | 5/2006 | Polz et al. |
| 7,064,498 B2 | 6/2006 | Dowling et al. |
| 7,069,345 B2 | 6/2006 | Shteyn |
| 7,072,945 B1 | 7/2006 | Nieminen et al. |
| 7,103,511 B2 | 9/2006 | Petite |
| D530,681 S | 10/2006 | Huang |
| 7,127,228 B2 | 10/2006 | Chang |
| 7,135,824 B2 | 11/2006 | Lys et al. |
| 7,161,311 B2 | 1/2007 | Mueller et al. |
| 7,167,777 B2 | 1/2007 | Budike, Jr. |
| 7,200,660 B2 | 4/2007 | Bruegger et al. |
| 7,202,608 B2 | 4/2007 | Robinson et al. |
| 7,204,622 B2 | 4/2007 | Dowling et al. |
| 7,218,056 B1 | 5/2007 | Harwood |
| 7,221,104 B2 | 5/2007 | Lys et al. |
| 7,231,482 B2 | 6/2007 | Leach |
| 7,233,831 B2 | 6/2007 | Blackwell |
| 7,256,554 B2 | 8/2007 | Lys |
| 7,262,559 B2 | 8/2007 | Tripathi et al. |
| 7,274,160 B2 | 9/2007 | Mueller et al. |
| D552,043 S | 10/2007 | Thursfield |
| 7,292,898 B2 | 11/2007 | Clark et al. |
| 7,310,344 B1 | 12/2007 | Sue |
| 7,327,275 B2 | 2/2008 | Brochu et al. |
| 7,336,670 B1 | 2/2008 | Calhoun et al. |
| 7,345,860 B2 | 3/2008 | Wong |
| 7,348,604 B2 | 3/2008 | Matheson |
| 7,352,138 B2 | 4/2008 | Lys et al. |
| 7,358,679 B2 | 4/2008 | Lys et al. |
| 7,358,681 B2 | 4/2008 | Robinson et al. |
| 7,358,706 B2 | 4/2008 | Lys |
| 7,365,282 B2 | 4/2008 | Altonen et al. |
| 7,410,271 B1 | 8/2008 | Man |
| 7,420,335 B2 | 9/2008 | Robinson et al. |
| 7,436,770 B2 | 10/2008 | Sterne et al. |
| 7,437,150 B1 | 10/2008 | Morelli et al. |
| 7,440,246 B2 | 10/2008 | Bonasia et al. |
| 7,464,035 B2 | 12/2008 | Funk et al. |
| 7,468,958 B2 | 12/2008 | Emery et al. |
| 7,496,627 B2 | 2/2009 | Moorer et al. |
| 7,498,952 B2 | 3/2009 | Newman, Jr. |
| 7,504,821 B2 | 3/2009 | Shuey |
| 7,526,539 B1 | 4/2009 | Hsu |
| 7,530,113 B2 | 5/2009 | Braun |
| 7,532,956 B1 | 5/2009 | Pelaez, Jr. et al. |
| 7,551,071 B2 | 6/2009 | Bennett, III et al. |
| 7,552,325 B2 | 6/2009 | Norton et al. |
| 7,561,554 B2 | 7/2009 | Ling |
| 7,566,155 B2 | 7/2009 | Schug et al. |
| D597,637 S | 8/2009 | Krohmer et al. |
| 7,586,420 B2 | 9/2009 | Fischer et al. |
| 7,592,925 B2 | 9/2009 | Nearhoof et al. |
| D601,976 S | 10/2009 | Petrillo et al. |
| 7,597,455 B2 | 10/2009 | Smith et al. |
| 7,608,807 B2 | 10/2009 | Hick et al. |
| 7,623,042 B2 | 11/2009 | Huizenga |
| 7,626,339 B2 | 12/2009 | Paton |
| 7,634,555 B1 | 12/2009 | Wainscott, Jr. et al. |
| 7,652,472 B2 | 1/2010 | Kobayashi et al. |
| 7,659,673 B2 | 2/2010 | Lys |
| 7,666,010 B2 | 2/2010 | Arenas et al. |

(56) References Cited

U.S. PATENT DOCUMENTS

| | | |
|---|---|---|
| 7,680,878 B2 | 3/2010 | Tsuchida et al. |
| 7,694,005 B2 | 4/2010 | Reckamp et al. |
| 7,702,421 B2 | 4/2010 | Sullivan et al. |
| 7,712,949 B2 | 5/2010 | Tufano et al. |
| 7,714,699 B2 | 5/2010 | Wessels |
| 7,737,643 B2 | 6/2010 | Lys |
| 7,746,877 B2 | 6/2010 | Trethewey |
| 7,747,781 B2 | 6/2010 | Maurya et al. |
| 7,781,979 B2 | 8/2010 | Lys |
| 7,800,049 B2 | 9/2010 | Bandringa et al. |
| 7,800,498 B2 | 9/2010 | Leonard et al. |
| 7,802,902 B2 | 9/2010 | Moss et al. |
| D625,750 S | 10/2010 | Wada |
| 7,806,558 B2 | 10/2010 | Williamson |
| 7,849,224 B2 | 12/2010 | Alrabady et al. |
| 7,860,679 B2 | 12/2010 | Rouhier et al. |
| 7,869,168 B2 | 1/2011 | Sullivan |
| 7,911,746 B2 | 3/2011 | Zaretsky et al. |
| 7,924,155 B2 | 4/2011 | Soccoli et al. |
| 7,955,096 B2 | 6/2011 | Arenas et al. |
| 7,966,661 B2 | 6/2011 | Gunawardena |
| 7,969,100 B2 | 6/2011 | Xu et al. |
| 7,983,795 B2 | 7/2011 | Josephson et al. |
| 8,008,802 B2 | 8/2011 | Leonard et al. |
| 8,018,166 B2 | 9/2011 | Soccoli et al. |
| 8,028,045 B2 | 9/2011 | Hofmann et al. |
| 8,047,883 B2 | 11/2011 | Montalbano et al. |
| 8,049,592 B2 | 11/2011 | Wang et al. |
| 8,050,801 B2 | 11/2011 | Richards et al. |
| 8,064,387 B2 | 11/2011 | Jiang et al. |
| 8,064,601 B1 | 11/2011 | Palanisamy et al. |
| 8,072,184 B2 | 12/2011 | Bhade et al. |
| 8,096,818 B2 | 1/2012 | Arenas et al. |
| 8,110,996 B2 | 2/2012 | Budike, Jr. |
| 8,115,626 B2 | 2/2012 | Hick et al. |
| 8,145,360 B2 | 3/2012 | Brundisini et al. |
| 8,159,149 B2 | 4/2012 | Mubaslat et al. |
| 8,209,400 B2 | 6/2012 | Baum et al. |
| 8,212,485 B2 | 7/2012 | Elek et al. |
| 8,220,958 B2 | 7/2012 | Montagne |
| 8,227,731 B2 | 7/2012 | Hick et al. |
| 8,248,203 B2 | 8/2012 | Hanwright et al. |
| 8,248,252 B2 | 8/2012 | Schechter et al. |
| 8,253,340 B2 | 8/2012 | Paton |
| 8,255,090 B2 | 8/2012 | Frader-Thompson et al. |
| 8,258,654 B2 | 9/2012 | Parsons |
| 8,278,838 B2 | 10/2012 | Shen |
| 8,281,010 B2 | 10/2012 | Ansari et al. |
| 8,295,255 B2 | 10/2012 | Nankano |
| 8,295,268 B2 | 10/2012 | Tanaka et al. |
| 8,299,721 B2 | 10/2012 | Smith |
| RE43,828 E | 11/2012 | Tufano et al. |
| 8,310,166 B2 | 11/2012 | Nagaoka |
| 8,312,347 B2 | 11/2012 | Hick et al. |
| 8,335,842 B2 | 12/2012 | Raji et al. |
| 8,371,863 B1 | 2/2013 | Ganta et al. |
| 8,400,321 B2 | 3/2013 | Williams |
| 8,443,071 B2 | 5/2013 | Lu et al. |
| 8,463,453 B2 | 6/2013 | Parsons, Jr. |
| D685,750 S | 7/2013 | Nakagawa |
| 8,502,660 B2 | 8/2013 | Hick |
| 8,520,512 B2 | 8/2013 | Gilde et al. |
| 8,530,840 B2 | 9/2013 | Carberry et al. |
| D690,662 S | 10/2013 | Maier et al. |
| 8,602,799 B2 | 12/2013 | Ganta et al. |
| 8,613,624 B2 | 12/2013 | Arenas et al. |
| 8,638,211 B2 | 1/2014 | Cohn |
| 8,653,750 B2 | 2/2014 | Deurenberg et al. |
| 8,667,287 B2 | 3/2014 | Bichsel et al. |
| 8,667,589 B1 | 3/2014 | Saprygin et al. |
| 8,681,463 B2 | 3/2014 | Franks et al. |
| 8,686,738 B2 | 4/2014 | Sexton et al. |
| 8,698,466 B2 | 4/2014 | Vanderzon |
| 8,731,689 B2 | 5/2014 | Platner et al. |
| 8,737,965 B2 | 5/2014 | McCown et al. |
| 8,796,940 B2 | 8/2014 | Altonen et al. |
| 8,836,476 B2 | 9/2014 | Campbell et al. |
| 8,893,968 B2 | 11/2014 | Jonsson |
| 8,954,170 B2 | 2/2015 | Chemel et al. |
| 9,025,287 B2 | 5/2015 | Privitera et al. |
| 9,055,624 B2 | 6/2015 | Middleton-White et al. |
| 9,099,955 B2 | 8/2015 | Ramirez |
| 9,144,139 B2 | 9/2015 | Joyce et al. |
| 9,177,467 B2 | 11/2015 | Tu |
| 9,192,019 B2 | 11/2015 | Huizenga et al. |
| 9,270,109 B2 | 2/2016 | Dolezilek et al. |
| 9,313,864 B2 | 4/2016 | Setomoto et al. |
| 9,320,101 B2 | 4/2016 | Sun et al. |
| 9,320,121 B2 | 4/2016 | Sun et al. |
| 9,335,750 B2 | 5/2016 | Lu et al. |
| 9,369,116 B2 | 6/2016 | Nederbragt et al. |
| 9,396,504 B2 | 7/2016 | Donde et al. |
| 9,413,772 B2 | 8/2016 | Zeng et al. |
| 9,419,435 B2 | 8/2016 | Testani |
| 9,438,122 B2 | 9/2016 | Mao et al. |
| 9,467,459 B2 | 10/2016 | Chandrasekaran |
| 9,544,798 B1 | 1/2017 | Ahmadzadeh et al. |
| 9,548,977 B2 | 1/2017 | Gabor |
| 9,560,727 B2 | 1/2017 | Reh et al. |
| 9,572,228 B2 | 2/2017 | Hening et al. |
| 9,576,786 B2 | 2/2017 | Greenberg |
| 9,596,716 B2 | 3/2017 | Deng et al. |
| 9,635,740 B2 | 4/2017 | Sun et al. |
| 9,681,299 B2 | 6/2017 | Ram et al. |
| 9,713,235 B2 | 7/2017 | Brochu et al. |
| 9,717,132 B2 | 7/2017 | Sun et al. |
| 9,723,488 B2 | 8/2017 | Atreya et al. |
| 9,730,300 B2 | 8/2017 | Meng et al. |
| 9,749,337 B2 | 8/2017 | Shim et al. |
| 9,769,903 B2 | 9/2017 | Hu et al. |
| 9,772,380 B2 | 9/2017 | Ware et al. |
| 9,801,247 B2 | 10/2017 | Hayashi et al. |
| 9,813,913 B2 | 11/2017 | Cho et al. |
| 9,820,361 B1 | 11/2017 | Turvy, Jr. et al. |
| 9,860,965 B2 | 1/2018 | Recker et al. |
| 9,883,570 B1 | 1/2018 | Turvy, Jr. et al. |
| 2003/0117985 A1 | 6/2003 | Fujii et al. |
| 2004/0010327 A1 | 1/2004 | Terashima et al. |
| 2004/0022186 A1 | 2/2004 | Kump et al. |
| 2004/0023530 A1 | 2/2004 | Garcia |
| 2004/0136358 A1 | 7/2004 | Hind et al. |
| 2004/0143510 A1 | 7/2004 | Haeberle et al. |
| 2004/0263084 A1 | 12/2004 | Mor et al. |
| 2005/0007024 A1 | 1/2005 | Evans et al. |
| 2005/0007031 A1 | 1/2005 | Hyder |
| 2005/0097162 A1 | 5/2005 | Budike, Jr. |
| 2005/0108430 A1 | 5/2005 | Howarth et al. |
| 2005/0259611 A1 | 11/2005 | Bhagwat et al. |
| 2005/0288823 A1 | 12/2005 | Hesse |
| 2006/0044152 A1 | 3/2006 | Wang |
| 2006/0215345 A1 | 9/2006 | Huizenga |
| 2006/0262462 A1 | 11/2006 | Barton |
| 2007/0049323 A1 | 3/2007 | Wang et al. |
| 2007/0293208 A1 | 12/2007 | Loh et al. |
| 2008/0007942 A1 | 1/2008 | Ruggles et al. |
| 2008/0042826 A1 | 2/2008 | Hevia et al. |
| 2008/0082637 A1 | 4/2008 | Krainz et al. |
| 2008/0106832 A1 | 5/2008 | Restrepo et al. |
| 2008/0209034 A1 | 8/2008 | Shin et al. |
| 2008/0246414 A1 | 10/2008 | Xu et al. |
| 2008/0266050 A1 | 10/2008 | Crouse et al. |
| 2008/0272586 A1 | 11/2008 | Hick et al. |
| 2008/0282182 A1 | 11/2008 | Oosaka |
| 2009/0059603 A1 | 3/2009 | Recker et al. |
| 2009/0103307 A1 | 4/2009 | Shu |
| 2009/0180261 A1 | 7/2009 | Angelides et al. |
| 2009/0235354 A1 | 9/2009 | Gray et al. |
| 2009/0251314 A1 | 10/2009 | Jiang et al. |
| 2009/0261734 A1 | 10/2009 | Newman, Jr. |
| 2009/0278479 A1 | 11/2009 | Planter et al. |
| 2009/0289757 A1 | 11/2009 | Ballard |
| 2009/0309501 A1 | 12/2009 | Catalano et al. |
| 2009/0322231 A1 | 12/2009 | Lobo |
| 2010/0037071 A1 | 2/2010 | Chang |

(56) References Cited

U.S. PATENT DOCUMENTS

| | | |
|---|---|---|
| 2010/0038440 A1 | 2/2010 | Ersavas |
| 2010/0101924 A1 | 4/2010 | Wu et al. |
| 2010/0114334 A1 | 5/2010 | Krumsiek |
| 2010/0122338 A1 | 5/2010 | Kataoka et al. |
| 2010/0237711 A1 | 9/2010 | Parsons |
| 2010/0244709 A1 | 9/2010 | Steiner et al. |
| 2010/0259193 A1 | 10/2010 | Umezawa et al. |
| 2010/0264313 A1 | 10/2010 | Jalbout et al. |
| 2010/0265700 A1 | 10/2010 | Galluccio et al. |
| 2010/0277300 A1 | 11/2010 | Cohn et al. |
| 2010/0277302 A1 | 11/2010 | Cohn et al. |
| 2010/0277306 A1 | 11/2010 | Leinen et al. |
| 2010/0277315 A1 | 11/2010 | Cohn et al. |
| 2010/0318685 A1* | 12/2010 | Kraus ............. G07C 9/00944 709/249 |
| 2010/0321929 A1 | 12/2010 | Ramirez et al. |
| 2011/0012434 A1 | 1/2011 | Lee et al. |
| 2011/0012532 A1 | 1/2011 | Barnett et al. |
| 2011/0026510 A1 | 2/2011 | Matsumura et al. |
| 2011/0090042 A1 | 4/2011 | Leonard et al. |
| 2011/0138058 A1 | 6/2011 | Ishida |
| 2011/0144820 A1 | 6/2011 | Trauer |
| 2011/0147037 A1 | 6/2011 | Tee et al. |
| 2011/0156911 A1 | 6/2011 | Caglianone |
| 2011/0175553 A1 | 7/2011 | Sampsell |
| 2011/0175699 A1 | 7/2011 | Huss et al. |
| 2011/0184577 A1 | 7/2011 | Ilyes |
| 2011/0187273 A1 | 8/2011 | Summerford et al. |
| 2011/0196755 A1 | 8/2011 | Landa |
| 2011/0210684 A1 | 9/2011 | Lanchava et al. |
| 2011/0215736 A1 | 9/2011 | Horbst et al. |
| 2011/0216546 A1 | 9/2011 | Lombardi et al. |
| 2011/0221348 A1 | 9/2011 | Kwag et al. |
| 2011/0248636 A1 | 10/2011 | Liao |
| 2011/0248643 A1 | 10/2011 | Liu et al. |
| 2011/0257766 A1 | 10/2011 | Sundaram et al. |
| 2011/0277001 A1 | 11/2011 | Kaluskar et al. |
| 2011/0278922 A1 | 11/2011 | Leonard et al. |
| 2011/0282509 A1 | 11/2011 | Yegin et al. |
| 2011/0284730 A1 | 11/2011 | Sturdevant |
| 2011/0291586 A1 | 12/2011 | Komagata et al. |
| 2011/0309769 A1 | 12/2011 | Kuroki et al. |
| 2012/0019150 A1 | 1/2012 | Yang et al. |
| 2012/0023552 A1 | 1/2012 | Brown |
| 2012/0038490 A1 | 2/2012 | Verfuerth |
| 2012/0056726 A1 | 3/2012 | Paul |
| 2012/0068611 A1 | 3/2012 | Steiner et al. |
| 2012/0086560 A1 | 4/2012 | Ilyes et al. |
| 2012/0091902 A1 | 4/2012 | Radermacher |
| 2012/0096120 A1 | 4/2012 | Couillabin et al. |
| 2012/0096519 A1 | 4/2012 | Alanara et al. |
| 2012/0098432 A1 | 4/2012 | Recker et al. |
| 2012/0112654 A1 | 5/2012 | Choong et al. |
| 2012/0126699 A1 | 5/2012 | Zittel |
| 2012/0136485 A1 | 5/2012 | Weber et al. |
| 2012/0151058 A1 | 6/2012 | Lee |
| 2012/0153867 A1 | 6/2012 | Van Den Biggelaar |
| 2012/0181935 A1 | 7/2012 | Velazquez |
| 2012/0187839 A1 | 7/2012 | Hammel et al. |
| 2012/0198533 A1 | 8/2012 | Thomas et al. |
| 2012/0212140 A1 | 8/2012 | Kim et al. |
| 2012/0219008 A1 | 8/2012 | Lee et al. |
| 2012/0221713 A1 | 8/2012 | Shin |
| 2012/0230698 A1 | 9/2012 | Park et al. |
| 2012/0236554 A1 | 9/2012 | Rust |
| 2012/0248312 A1 | 10/2012 | Soccoli et al. |
| 2012/0256540 A1 | 10/2012 | Batty et al. |
| 2012/0274234 A1 | 11/2012 | Campbell et al. |
| 2012/0274791 A1 | 11/2012 | Thomas et al. |
| 2012/0278640 A1 | 11/2012 | Caglianone |
| 2012/0293013 A1 | 11/2012 | Parsons |
| 2012/0296487 A1 | 11/2012 | Leinen et al. |
| 2012/0299566 A1 | 11/2012 | Hsu |
| 2012/0306621 A1 | 12/2012 | Muthu |
| 2012/0313588 A1 | 12/2012 | Carberry et al. |
| 2013/0010018 A1 | 1/2013 | Economy |
| 2013/0049591 A1 | 2/2013 | Quercia et al. |
| 2013/0132787 A1 | 5/2013 | Hick et al. |
| 2013/0162160 A1 | 6/2013 | Ganton |
| 2013/0181617 A1 | 7/2013 | Maddox |
| 2013/0208382 A1 | 8/2013 | Vanderzon |
| 2013/0214163 A9 | 8/2013 | Soccoli et al. |
| 2013/0229132 A1 | 9/2013 | Fong |
| 2013/0242929 A1* | 9/2013 | Gorgen ............. H04L 45/36 370/329 |
| 2013/0253721 A1 | 9/2013 | Parsons |
| 2013/0271004 A1* | 10/2013 | Min ............. H05B 33/0842 315/112 |
| 2013/0279553 A1 | 10/2013 | Hick et al. |
| 2013/0301390 A1 | 11/2013 | Hick |
| 2013/0342687 A1 | 12/2013 | Leinen |
| 2014/0039713 A1 | 2/2014 | Hick et al. |
| 2014/0098247 A1 | 4/2014 | Rao et al. |
| 2014/0130155 A1 | 5/2014 | An et al. |
| 2014/0167621 A1 | 6/2014 | Trott et al. |
| 2014/0233138 A1 | 8/2014 | Gliebe |
| 2014/0269660 A1 | 9/2014 | Dunn et al. |
| 2014/0312802 A1 | 10/2014 | Recker et al. |
| 2015/0061500 A1 | 3/2015 | Yeh |
| 2015/0082429 A1 | 3/2015 | Rangarajan et al. |
| 2015/0085725 A1 | 3/2015 | Estevez et al. |
| 2015/0100166 A1 | 4/2015 | Baynes et al. |
| 2015/0127556 A1 | 5/2015 | Harada |
| 2015/0177948 A1 | 6/2015 | Sasaki et al. |
| 2015/0236643 A1 | 8/2015 | Khan et al. |
| 2015/0296599 A1 | 10/2015 | Recker et al. |
| 2015/0332586 A1 | 11/2015 | Hamm |
| 2016/0021723 A1 | 1/2016 | Huizenga et al. |
| 2016/0080391 A1 | 3/2016 | Hasegawa et al. |
| 2016/0085431 A1 | 3/2016 | Kim et al. |
| 2016/0088424 A1 | 3/2016 | Polo |
| 2016/0308686 A1 | 10/2016 | Vijayrao et al. |
| 2017/0025842 A1 | 1/2017 | Peterson |
| 2017/0025892 A1 | 1/2017 | Vanostrand |
| 2017/0163519 A1 | 6/2017 | Bowers et al. |
| 2017/0245351 A1 | 8/2017 | Leinen et al. |
| 2017/0277147 A1 | 9/2017 | De Vaan et al. |
| 2018/0027633 A1 | 1/2018 | Roquemore et al. |
| 2018/0000702 A1 | 3/2018 | Goldfarb |
| 2018/0059175 A1 | 3/2018 | Hase |

FOREIGN PATENT DOCUMENTS

| | | |
|---|---|---|
| CN | 2325832 | 6/1999 |
| CN | 1119888 | 8/2003 |
| CN | 101155029 | 4/2008 |
| CN | 101226861 | 7/2008 |
| CN | 100414943 | 8/2008 |
| CN | 101867990 | 10/2010 |
| CN | 201655922 | 11/2010 |
| CN | 103458577 | 12/2013 |
| CN | 203368836 | 12/2013 |
| CN | 103561405 | 2/2014 |
| CN | 105722284 | 6/2016 |
| CN | 105899009 | 8/2016 |
| CN | 106949423 | 7/2017 |
| CN | 107094298 | 8/2017 |
| EM | 0890059 | 6/2004 |
| EM | 0870384 | 11/2005 |
| EM | 1371211 | 11/2005 |
| EM | 1535495 | 1/2010 |
| EM | 2474080 | 7/2012 |
| EM | 2595456 | 5/2013 |
| EM | 2725769 | 4/2014 |
| EP | 0923274 | 6/1999 |
| EP | 1832041 | 9/2007 |
| EP | 2549610 | 1/2013 |
| EP | 3022975 | 5/2016 |
| EP | 3070970 | 9/2016 |
| EP | 2485533 | 10/2016 |
| EP | 3282665 | 2/2018 |
| JP | 3892909 | 12/2006 |
| JP | 4141840 | 6/2008 |
| JP | 2009022028 | 1/2009 |

(56) References Cited

FOREIGN PATENT DOCUMENTS

| | | |
|---|---|---|
| JP | 4625697 | 11/2010 |
| JP | 2017011907 | 1/2017 |
| KR | 2011022816 | 3/2011 |
| TW | 384583 | 3/2000 |
| WO | 03049379 | 6/2003 |
| WO | 2005018162 | 2/2005 |
| WO | 2006040364 | 4/2006 |
| WO | 2009098074 | 8/2009 |
| WO | 2009103587 | 8/2009 |
| WO | 2010017588 | 2/2010 |
| WO | 2010039016 | 4/2010 |
| WO | 2010083629 | 7/2010 |
| WO | 2012060679 | 5/2012 |
| WO | 2012109696 | 8/2012 |
| WO | 2012145766 | 10/2012 |
| WO | 2013046849 | 4/2013 |
| WO | 2014081205 | 5/2014 |
| WO | 2013119030 | 8/2015 |
| WO | 2015144231 | 10/2015 |
| WO | 2017069736 | 4/2017 |
| WO | 2017080394 | 5/2017 |
| WO | 2017091047 | 6/2017 |
| WO | 2017099763 | 6/2017 |

OTHER PUBLICATIONS

"EyeNut Ingenious Control", Harvard Technology; Retrieved from http://www.harvardtechnology.com/solutions/eyenut.
"LevNet RF Self-Powered Wireless Light Sensor; Self-Powered RF Wireless Light Sensor for use with LevNet RF Receivers", Leviton, Product Data; 2010.
"Smart Choices for Scalable Automation Solutions. Total Control of Your Business from Anywhere", Leviton.
"Wiscape Wireless Street Lighting Controls", Hubbell.
Dini, et al., "Considerations on Security in ZigBee Networks", University of Pisa, Italy; Jul. 7, 2010.
Farmer, et al., "ZigBee Wikipedia", Retrieved from: https://en.wikipedia.org/wiki/ZigBee?oldid=709776015; Accessed in Mar. 2016.
Inter.Light, Inc., "Light Guide: Occupant Sensors", Retrieved from: http://www.lightsearch.com/resources/lightguides/sensors.html on Nov. 9, 2016.
Kyaw, Zin, Metering International, World Meter Design Congress, Texas Instruments, San Diego, CA; Mar. 2010.
Lee, et al., "A Smart Energy System with Distributed Access Control", Department of Computer Science, National Tsing Hua University, Taiwan, Department of Computer Science, University of California, Irvine, USA.
Masica, Ken, "Recommended Practices Guide for Securing ZigBee Wireless Networks in Process Control System Environments", Control Systems Security Program, Apr. 2007.
Piro, et al., "A standard compliant security framework for IEEE 802.15.4 networks", Politecnico di Bari, Italy, Mar. 6, 2014.
Silicon Laboratories Inc., "UG103.5: Application Development Fundamentals: Security", Rev. 1.0; Accessed on Apr. 20, 2016.
Smartthings, Inc., "Security of SmartThings ecosystem", Accessed on Apr. 20, 2017.
US Dept of Energy, "Wireless Sensors for Lighting Energy Savings", Federal Energy Management Program, Mar. 2016.
Wang, et al., "Design of Smart Home System Based on WiFi Smart Plug", International Journal of Smart Home; vol. 9, No. 6; pp. 173-182; Jun. 2015.
ZigBee Alliance, Inc., "Security and encryption-XBee ZigBee Mesh Kit;", Accessed on Jul. 29, 2016.
ZigBee Alliance, Inc., "Security on the XBee-XBee ZigBee Mesh Kit", May 10, 2017.
ZigBee Alliance, Inc., "ZigBee in a nutshell-XBee ZigBee Mesh Kit", Jul. 10, 2015.
ZigBee Alliance, Inc., "ZigBee Over-the-Air Upgrading Cluster", Revision 18, Version 1.0, San Ramon, CA, Mar. 14, 2010.
ZigBee Alliance, Inc., "ZigBee Security Model-XBee ZigBee Mesh Kit"; May 10, 2017.
ZigBee Alliance, Inc., "ZigBee Smart Energy Standard", Revision 19, Version 1.2a, Dec. 3, 2014.
Zillner, Tobias, "ZigBee Exploited %he good, the bad and the ugly", Version 1.0, Vienna, Austria, Aug. 6, 2015.
"Arrow Hart self test GFCI receptacles with audible alarm", Technical Data; EATON; Apr. 2017.
"Audible Alarm Tamper-Resistant CFCI Receptacle, White", Product page, Legrand.
"CFCI Trip Alarm Text Message System, Cellular Tripped GFCI Alarm, Wireless GFCI Trip Alarm", Product purchasing page, Aqua Technologies Group, 2018.
"Fixture-Integrated Wireless Controls for High Proformance Lighting Management", Acuity Controls, Mar. 2016.
"Luminair 3", SynthFX, Retrieved Apr. 4, 2018.
"Philips Hue Lights", Retrieved Apr. 4, 2018, Philips.
"PowPak Wireless Fixture Control", Lutron; Jan. 20, 2015.
"Universal Dimmer 800W", Clipsal by Schneider Electric; Installation Instructions; Aug. 2013.
"Universal motor speed control and light dimmer with TRIAC and ST7LITE", ST; Oct. 2007; Rev 3.
ARUBA, "AirWave 8.2.5", User Guide; Oct. 2017; Rev.01.
Biery, Ethan, "Challenges of Dimming LED Loads on ELV and MLV Transformers", Lutron Electronics; Jun. 2014.
CISCO, "Rogue Management in a Unified Wireless Network", Updated: Aug. 10, 2010.
Sargent, Mikah, "How to control your lights with Amazon Echo", Jan. 20, 2018, Amazon.
Saruhan, Ibrahim Halil, "Detecting and Preventing Rogue Devices on the Network", SANS Institute 2007; InfoSec Reading Room; Accepted Aug. 8, 2007.
Non Final Office Action issued for U.S. Appl. No. 15/492,373 dated Feb. 6, 2018.
Notice of Allowance issued for U.S. Appl. No. 15/620,448 dated Feb. 5, 2018.
Non Final Office Action issued for U.S. Appl. No. 15/357,900 dated Feb. 28, 2018.
Non Final Office Action issued for U.S. Appl. No. 15/621,536 dated Feb. 21, 2018.

\* cited by examiner

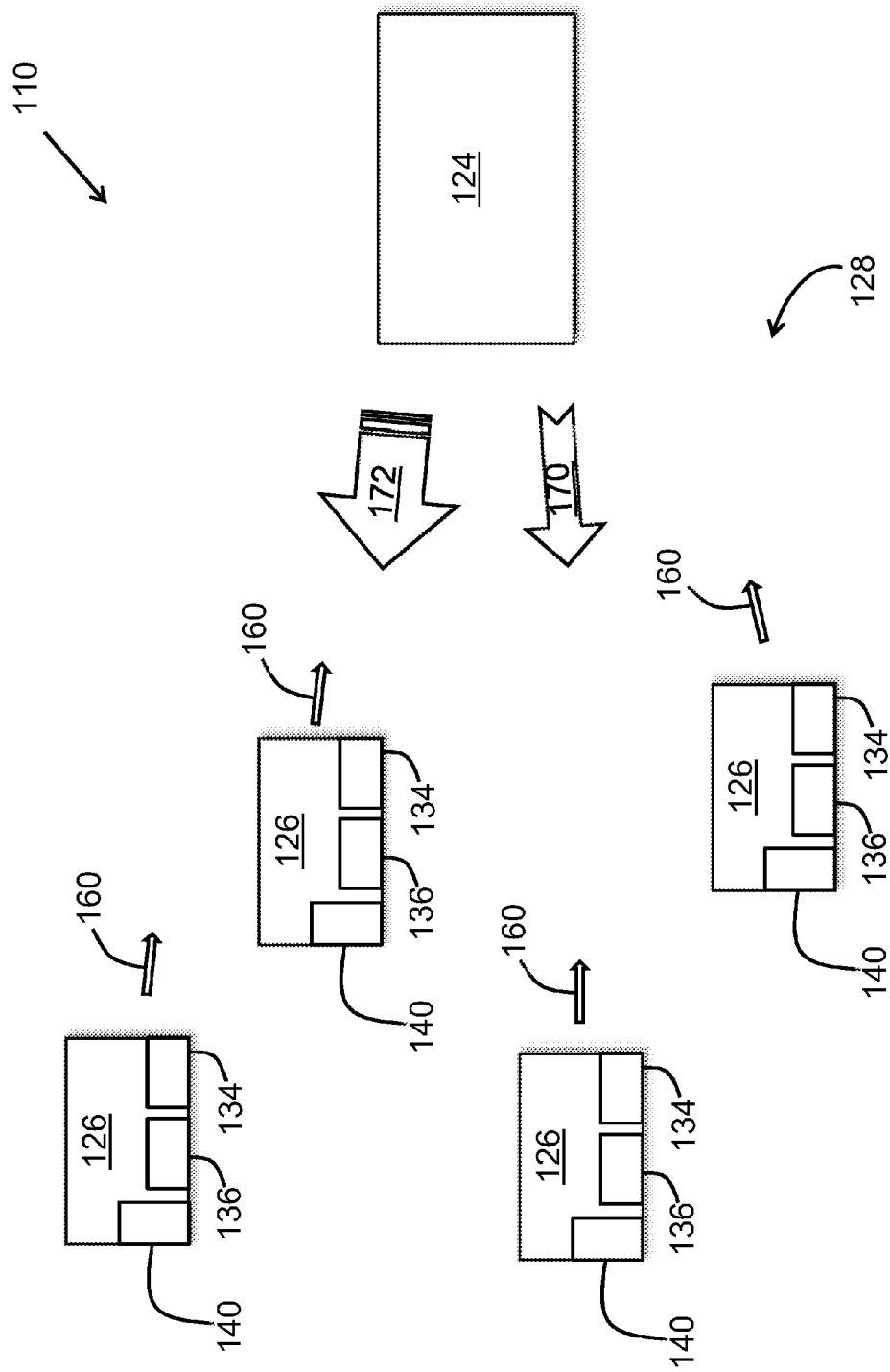

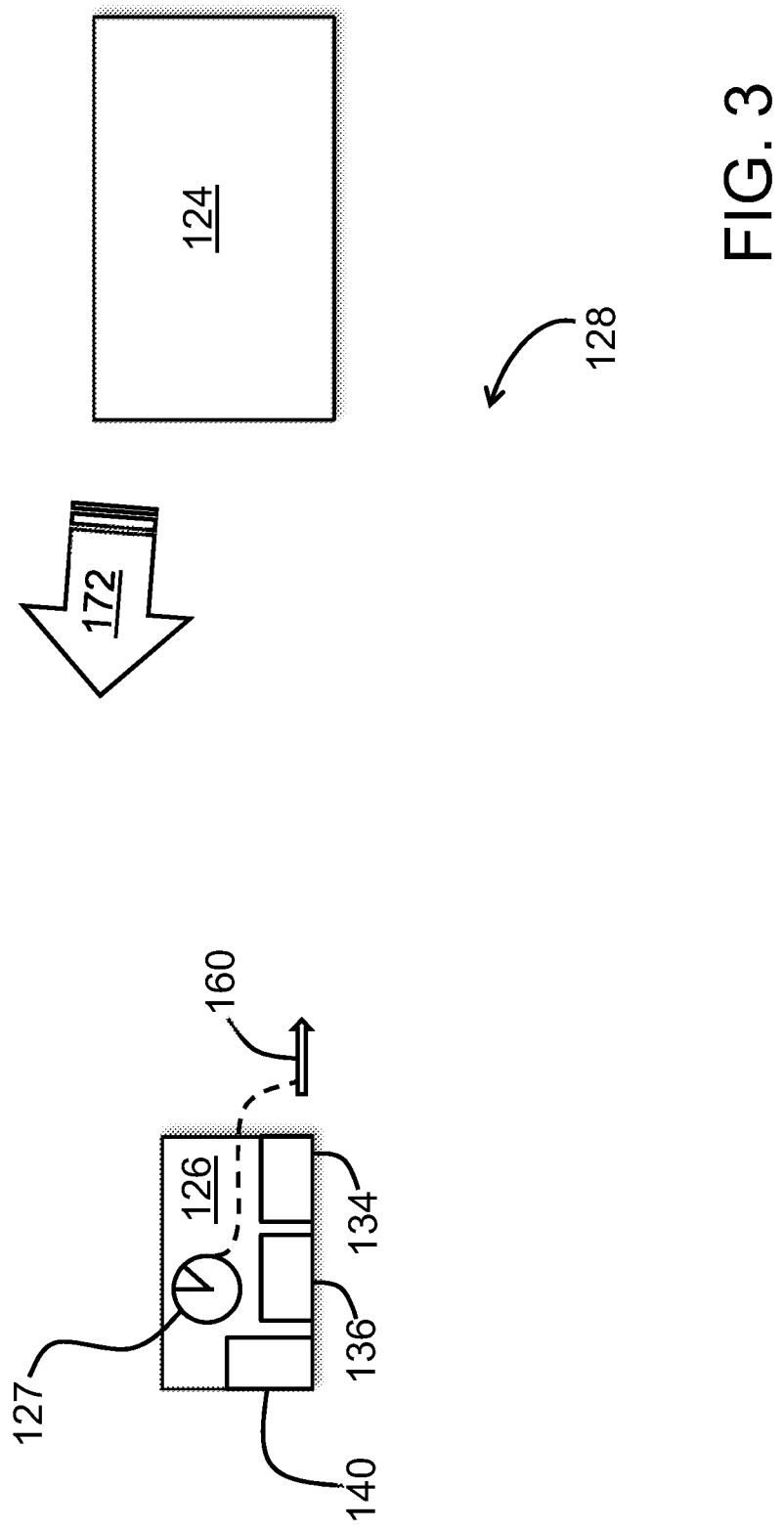

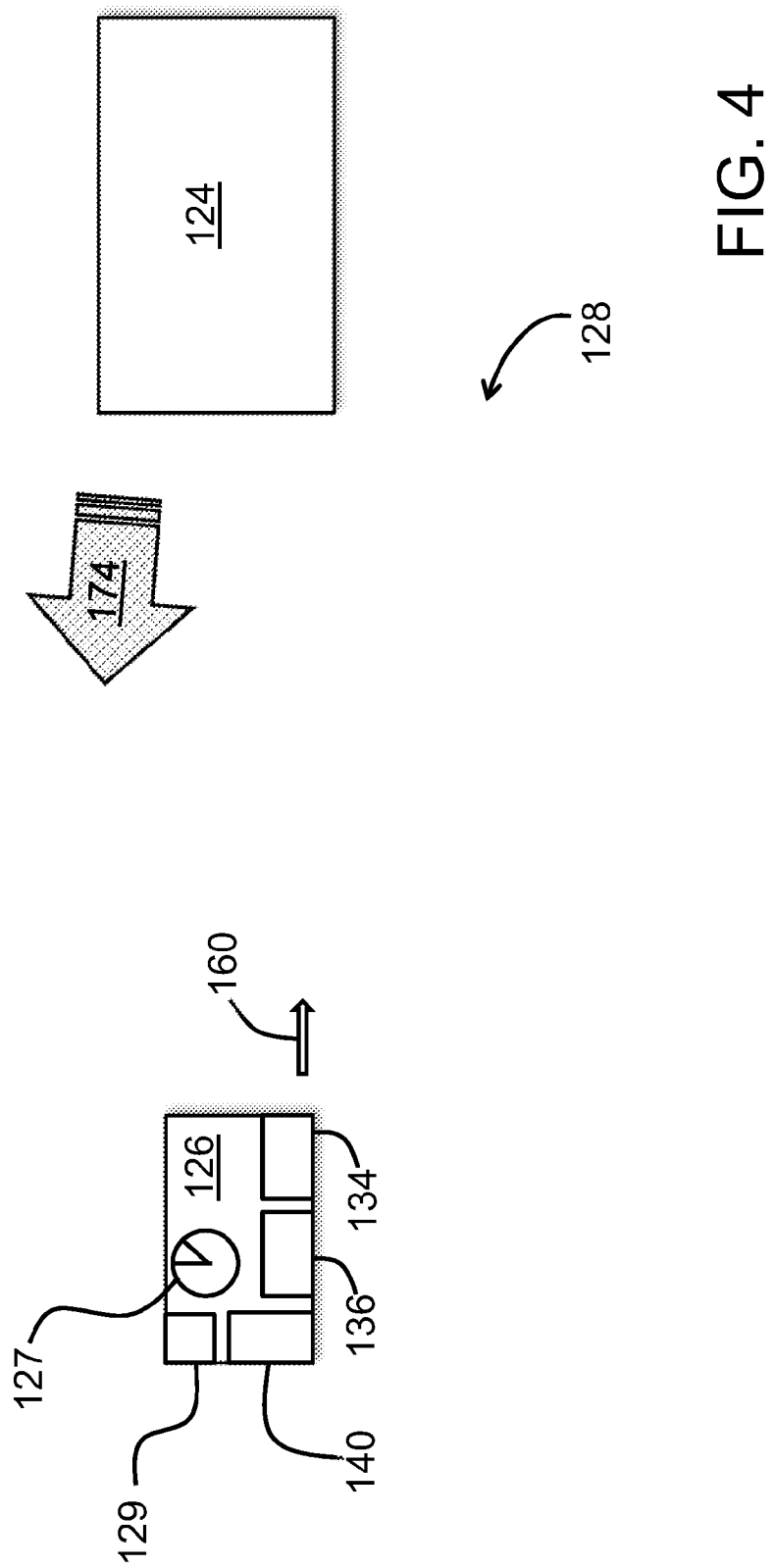

SYSTEMS AND METHODS FOR ACKNOWLEDGING BROADCAST MESSAGES IN A WIRELESS LIGHTING CONTROL NETWORK

CROSS-REFERENCE TO RELATED APPLICATIONS

This application is a continuation-in-part of U.S. application Ser. No. 15/357,900, filed Nov. 21, 2016, which is a continuation-in-part of U.S. application Ser. No. 14/823,560, filed Aug. 11, 2015, which claims the benefit of U.S. Provisional Application No. 62/035,558, filed Aug. 11, 2014, and U.S. application Ser. No. 15/357,900, filed Nov. 21, 2016, also claims the benefit of U.S. Provisional Application No. 62/257,908, filed Nov. 20, 2015, the entireties of which are hereby incorporated herein by reference. Any disclaimer that may have occurred during the prosecution of the above-referenced application(s) is hereby expressly rescinded.

COPYRIGHT NOTICE

A portion of the disclosure of this patent document contains material which is subject to copyright protection. The copyright owner has no objection to the facsimile reproduction by anyone of the patent disclosure, as it appears in the United States Patent and Trademark Office patent files or records, but otherwise reserves all copyright rights whatsoever.

FIELD

The present disclosure relates generally to control systems, and more particularly to wireless lighting control systems for remotely, locally, and automatically monitoring and controlling devices, such as lighting fixtures.

BACKGROUND

Various systems are known for remotely monitoring, wirelessly controlling or automating operation of electrical devices. For example, home. or building automation systems may facilitate automated control of various electrical devices, such as lighting fixtures. That is, various electrical devices may be configured to operate according to predetermined schedules or events, such as in response to time or other user preferences. Remote monitoring or wireless control of certain electrical devices is also offered, including the monitoring or controlling of electrical devices over a network using a mobile device. As the automation and control, including wireless control, of electrical devices becomes more popular and as the desired control becomes more complex, there is a need for robust device control systems that are relatively straightforward to install, configure, and use. Although some relatively sophisticated systems are available, it was noticed by the inventors of the present disclosure that delays in responding to lighting commands or delays in fixtures acknowledging receipt and/or execution of lighting commands still occur, especially when controlling a large number of light fixtures.

SUMMARY

In one aspect, the present disclosure includes a wireless lighting control system. The wireless lighting control system includes a cloud-based or other remote server system connected to a wide area network and having control software for configuring, monitoring, and controlling lighting fixtures at an organization's installation site. The wireless lighting control system also includes a wireless gateway located at the site and configured to communicate with the remote server via cellular communication. Wireless devices are in wireless communication with the gateway via a wireless mesh network, and at least some of the wireless devices are configured to control one or more of the lighting fixtures. A mobile or other user computer device can be connected to the wide area network and has a user interface enabling a user to access the server control software and control and configure the lighting fixtures associated with wireless devices at the site according to the user's granted permissions. Control instructions entered on the server through the user interface are communicated from the server to the wireless gateway and then from the wireless gateway to the wireless devices.

Installation, commissioning, and configuration of a wireless gateway and wireless devices at the system installation site can be completed by a qualified electrical contractor without requiring training specific to the wireless lighting control system. The site wireless devices can include occupancy/vacancy and other condition sensors, daylight harvesting sensors, wall dimmers, touchscreens, and controllers. A controller may include an actuator and can be configured to switch power on and off, dim, and monitor power and other conditions of a lighting fixture and other lighting devices, for example, a motorized window shade. A controller can also be configured as a trigger that will monitor a non-system device or third-party sensor which is not part of the mesh network and relay data from the device or sensor to the lighting control system. Controllers and certain other wireless devices can also act as a mesh network repeater to extend the area encompassed by the installation site.

Once commissioned, the system enables easy configuration and control of sensing, dimming, automations, schedules, scenes, and monitoring of the site's lighting fixtures and associated devices. One or more light fixtures that will all behave in a like manner form a "zone" and are associated with a single or a common wireless device. An "area" can be formed by a grouping of zones which are configured to respond together to a single event or command, for example, a schedule. A "scene" provides a collection of state change requests, for example, preset saved illumination levels for a zone or area. Monitoring can include real-time and/or archived measurement of status and power consumption reported from wireless devices to the remote server. Control, monitoring, and configuration changes can be easily made by users via a user interface accessible using a touchscreen control devices coupled to the wireless mesh network or a user computer device, for example, a mobile device, in communication with the remote server via a wide area network (WAN) such as the internet.

In some aspects, embodiments of the present disclosure provide improved systems and methods for acknowledging broadcast messages in a wireless control network.

Embodiments of the present disclosure can also provide improved systems and methods for acknowledging broadcast messages in a wireless control network.

At least one embodiment of the invention is related to decreasing conflicts between individual lighting devices when responding to a broadcast/multicast message sent to a group of devices.

Some embodiments of the present disclosure limit the number of time delays usable by each device to one of a set number of time delays, where the set number of time delays are assigned by an external source, such as the gateway. Moreover, the set number of time delays can be set at any time prior to the broadcast message, such as during the commissioning process.

In addition to potentially using a mesh network where the routers forward one or more messages onto other routers or devices after a predetermined delay, which may correspond to a time window in a broadcast protocol method, embodiments of the present disclosure can send a response message back to the original device generating the message after a time delay.

While some embodiments may send a delay notification from the gateway to a LAN (local area network) client notifying the LAN client that a message the LAN client was attempting to send through the gateway to a node has been delayed (and the notification may include an estimate for how long the delay will be), embodiments of the present disclosure send a response to the message sending device (such as from the gateway to the LAN client) after delaying for a preset (or random) time.

Still other embodiments may include assigning each device one of a limited number of preset time delays for responding to a broadcast message, especially where the total number of preset time delays are less than the number of devices (here some devices will have the same time delays as other devices).

In still other aspects, further embodiments of the present disclosure can set each lighting device with a specific, preset time delay.

Still other embodiments of the present disclosure may broadcast a message with a bitmap designating which one or more individual devices the message is intended for. Each device could have a unique identifier and be capable of decoding the bitmap to determine if the bitmap was intended for each device. The devices can then decode the bitmap and determine whether the message should be acted upon or ignored by the individual devices.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 2 illustrates a wireless device control system and a wireless mesh network according to another embodiment of the present disclosure;

FIG. 3 illustrates an optional implementation of the wireless mesh network depicted in FIG. 2 according to another embodiment of the present disclosure; and FIG. 4 illustrates another optional implementation of the wireless mesh network depicted in FIG. 2 according to still another embodiment of the present disclosure.

DETAILED DESCRIPTION OF THE ILLUSTRATED EMBODIMENTS

Figure 1:
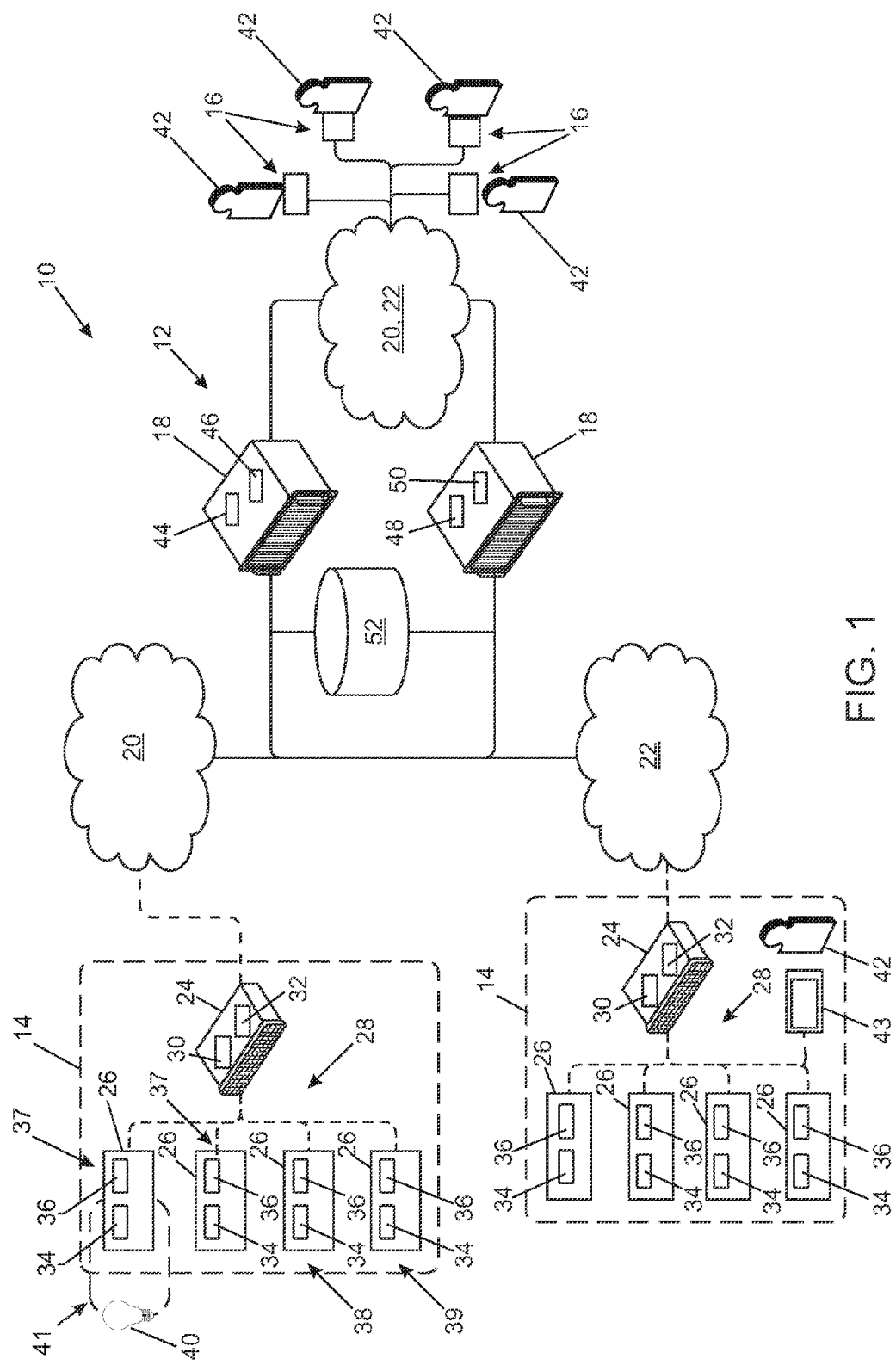
FIG. 1 illustrates an exemplary wireless device control system, according to at least one embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, power, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

FIG. 1 illustrates an exemplary wireless device control system 10, according to the present disclosure. Although a wireless lighting control system will be described, it should be appreciated that the systems and methods described herein are applicable to the automation, monitoring, and/or control of a variety of devices or components in a variety of environments. The exemplary system 10 generally includes a server, or backend, system 12, one or more site systems 14, and various clients, also referred to throughout as user computer devices, 16. Exemplary site systems 14 may include all or portions, including indoor and/or outdoor portions, of a home, business, parking garage, street, worksite, or other location that include a predefined set of components, such as electrical devices or circuits, including, for example, light fixtures, to be monitored or controlled.

The server system 12 may include one or more servers, or computers, 18 including typical computer components, such as a processor, memory, storage, display, network interface, and input/output device, for example. The processor, or processors, may execute unique sets of instructions, which may be implemented as computer readable program code, stored in memory or storage, such that the server system 12 is configured as a special purpose system. In particular, hardware, software, and particular sets of instructions may transform the server system 12, or portions thereof, into a lighting control server system, as described herein. As should be appreciated by those skilled in the art, the server system 12 may also include any combination of computer hardware and software that facilitates communication with the site systems 14 and user computer devices 16, and performance of the functions described herein.

According to a specific implementation, all or portions of the server system 12 may be cloud-based virtual servers, including a virtual private cloud-based service. That is, for example, the one or more servers 18 of the server system 12 may reside on the Internet, for example, rather than on a local computer. To be clear, the server system 12 may be remote from the site systems 14 and/or the user computer devices 16. For example, Digi® Device Cloud, offered by Digi® International, Inc., is a public cloud platform for device network management that may be used for all or portions of the server system 12. The server system 12 may communicate with the site systems 14 and the user computer devices 16 over a wide area network (WAN), such as the Internet 20 or a cellular network 22, and/or via a local area network (LAN), for example. Some embodiments in particular use cellular communication. Cellular communication may be quicker to set-up, more secure and/or more reliable than other available communications means, such as an installation site's broadband internet connection. By using a cellular network, embodiments of the present disclosure are able to keep out of the organization's corporate network, which can assist in mitigating accidental creation of back doors through firewalls and into the user's corporate network that could potentially be used to create a security breach in the organization's corporate network.

Each site system 14 may generally include at least one gateway, or base station, 24, and one or more wireless devices 26, or device nodes, which are configured to communicate over a mesh network 28, or other similar local wireless network.

The gateway 24 may include a communications module 30 that facilitates communication between the mesh network 28, or other wireless network, and the WAN network 20 or 22. As such, the gateway 24 can facilitate communication between the devices 26 of the site system 14 and the server system 12. The gateway 24 may also include an operations module 32 for processing and/or communicating instructions (e.g., to devices 26) received from the server system 12. The operations module 32 may also receive and/or process information from the devices 26. That is, the gateway 24 may run applications locally while also interfacing across the mesh network 28 for WAN connectivity to the server system 12.

The gateway 24 can manage the mesh network 28 and communicate with the server system 12. In at least one sense, the gateway 24 can ultimately control the devices 26, with control information mirrored from the server system 12, with which users 42 and user computer devices 16 can directly interact. According to at least one embodiment of the present disclosure, the gateway 24 communicates with the server system 12 via cellular or, in some particular embodiments, machine-to-machine cellular. As such, the gateway 24 may be provided with a subscriber identity module (SIM) card for facilitating communication over a cellular network, for example, private, encrypted 3G cellular connection independent of any site networks. This connection may be maintained while the gateway 24 is powered on, and, by avoiding the use of an Ethernet, WiFi, or other shared internet connection, may be more secure than alternative communications means.

Embodiments for packet routing through mesh network 28 include ad hoc network routing where the shortest path from a device 26 to the gateway 24 is continually updated and used for communications. Still other embodiments utilize source routing where a routing path from a device 26 to the gateway is initially set and remains unchanged until the routing path is updated at a later (typically predetermined) time. Still other embodiments will utilize ad hoc routing when there are a particular number of nodes in the mesh network 28 (e.g., 40 or less) and will utilize source routing when there are a different number of nodes in the mesh network (e.g., >40 nodes). An exemplary gateway device may be, for example, the XBee® Zigbee® Gateway provided by Digi® International, Inc.

Each device 26 may include a communications module 34, facilitating communication between the device 26 and the gateway 24 over a local wireless network, such as the mesh network 28. For example, the devices 26 may each include a radio transceiver, such as a XBee® radio module for communicating using the ZigBee® protocol, which is related to IEEE standards, including 802.15.4. The devices 26 may also include at least one control module 36 for facilitating interaction between the device 26 and an associated electrical component, such as, for example, an electrical circuit. Devices 26 may also each be configured to act as a repeater, or router, such that it can also forward messages to other devices 26 and/or the gateway 24.

Each site 14 may include a variety of different devices 26 managed by the gateway 24 and connected to the mesh network 28. For example, according to one implementation, a site 14 may include controllers 37, sensors, such as occupancy sensors, 38, daylight harvesters 39, and user site devices, such as touchscreens and wall dimmers, 43. Controllers 37 may include an actuator providing dimming and/or ON/OFF control for light fixtures 40, such as LED and/or fluorescent lights, on a common electrical circuit 41. Controllers 37 may additionally or alternatively provide a power usage measurement. Further, controllers 37 may be configured to act an event trigger by detecting voltage and/or current to determine the state of a device, such as, for example, a room light switch or a light fixture having its own motion sensor, or other sensor, to activate it. Sensors 38 that are part of the system 10 may be configured to detect and report the state of motion sensors, for example occupancy/vacancy sensors, while daylight harvesters 39 may include a light sensing circuit for measuring light and reporting measurements and other data to the system 10.

Devices 26 and associated site lighting fixtures 40 may be controlled, monitored, and managed by users 42, via user computer devices 16 and user site devices 43. Generally speaking, devices 26 can act as actuators, causing changes in the environment (e.g., turning lights on or off), and/or sensors, detecting and/or responding to some input from the environment, such as movement or light, at the respective sites. Although not an exhaustive list, some exemplary devices 26 can include occupancy/vacancy and other condition sensors, daylight harvesting sensors, wall dimmers, touchscreens, and controllers. Standard color coating of wires is used in some embodiments to facilitate ease of installation by electrical technicians.

Each of the user computer devices, or clients, 16 may include a computing device, such as, for example, a personal computer, laptop computer, netbook computer, tablet device, mobile device, portable electronic device (PED), smart device, or cell phone configured to communicate with the server system 12 via WAN 20 or 22, or possibly with the gateway 24, to permit a user 42 to configure, monitor, and/or control devices 26 for a particular site system 14. That is, a user 42 may access a control program, or control logic, on the server system 12 through an appropriate user interface using user computer device 16, which may have web-browsing abilities or may have a control application installed thereon. For example, upon requesting a Uniform Resource Locator (URL) address corresponding to a website hosted by the server system 12, a web page may be loaded in a web browser of one of the client devices 16. That is, one of the servers 18 may be or may include a web server for delivering web content to the user 42 through one of the user computer devices 16 described above. Thereafter, the user 42 may be provided with an option of registering for or accessing an account.

The system 10 or, more specifically, the server system 12 may include a plurality of modules useful in carrying out the control and other strategies disclosed herein. For example, the server system 12 may include or utilize functionality expressed with reference to an organization account registration module 44, a user manager module 46, a device manager module 48, and a communications module 50, to name a few. It should be appreciated that the term "modules," as used herein, is for ease of explanation, rather than limitation, and is intended to represent certain related aspects or functionality of the wireless device control system 10. Each of the modules may represent a set of computer instructions, or computer readable program code, representing processes for performing specific tasks of the wireless device control system 10. The tasks may be performed using a processor, or processors, and may require the access or manipulation of data stored in a data repository 52.

The account registration module 44 may facilitate the creation of accounts for organizations and/or users, such as users 42, within the system 10. For example, the registration module 44 may be used to collect data input by users 42 and/or authorized administrators and/or customer service representatives accessing the wireless device control system 10 through one of various user computer devices 16. According to some embodiments, the various user computer devices 16 may include any suitable electronic communication devices and/or workstations, such as, for example, personal computers, laptop computers, netbook computers, tablet devices, mobile devices, PEDs, smart devices, and cell phones. The account registration module 44 may be used to collect various information, including, for example, personally identifiable information, such as, for example, name, address, and phone number.

The user manager module 46 may include and/or implement rules pertaining to the various users 42, or user types, of the system 10. For example, when one of the users 42 is registered, a user profile including user credentials, such as a username and password, may be created for the user 42 and stored in the data repository 52. The user manager module 46 may be configured to ensure that each user 42, as identified using the unique credentials, is provided with appropriate access and/or capabilities with regard to the system 10. For example, the user manager module 46 may include an association of each user 42 to one or more sites, and may define appropriate permissions for each user 42 relative to respective organization and/or respective site systems 14.

The wireless device control system 10 or, more specifically, the server system 12 may include a database management system including one or more databases, such as data repository 52. The data repository 52 may store data, including the account and user data described above, useful in carrying out the strategies disclosed herein. Although the data repository 52 is illustrated as a component within the server system 12, it should be appreciated that the server system 12 may include any number of separate components or systems, including separate database(s), configured to communicate with one another in a manner consistent with the teachings disclosed herein.

The device manager module 48 may provide the main functionality of the server system 12. For example, after account registration is completed and appropriate organizations and/or users are established in the system 10, the device manager module 48 may be programmed and/or configured to permit users 42 to remotely control and manage specific associated site systems 14. The device manager module 48 may also monitor and process data from the data repository 52, and/or acquired data, to facilitate configuration, monitoring, and control of the site systems 14. According to a specific example, the device manager module 48 may receive control information from users 42 via user computer devices 16, store the information in the data repository 52, and mirror the information to the appropriate gateway 24 for implementation. According to some embodiments, the data repository 52 may be initially populated with at least some default control data.

With reference to FIG. 2, at least one embodiment is implemented with a lighting control system 110 that uses a wireless mesh network 128, for example, a Zigbee (IEEE 802.15.4) mesh network, to provide communication between a coordinator, for example gateway 124 (configured as a coordinator), and a large number of devices, for example lighting devices 126, (which may be configured as repeaters and/or end-devices). For example, in an office building setting, the lighting control system could include one gateway communicating with 200 lighting devices. Each lighting device 126 includes a communications module, for example, mesh network transceiver 134 and a control module, for example an electrical relay 136 for turning on one or more light fixtures. The lighting devices 126 may also contain one or more sensors 140, for example, a power, light, or an occupancy type sensor.

Mesh network coordinators, in this case gateway 124, are capable of directing a message 170 to one or more specific devices 126 (e.g., a single device) in the mesh network or sending a 'broadcast' message 172 that is directed to all devices in the network 128. Broadcast messages reduce message traffic by allowing a single transmission for messages that impact multiple devices (e.g., all devices 126) in the mesh network. This dramatically reduces latency over having to send separate messages 170 to each device 126 in a large network. For example, a broadcast message 172 could be used to turn on every light in lighting control system 110, such as in the event of an emergency.

It is also advantageous to have each device in the mesh network 128 acknowledge receipt of a broadcast message 172, for example, acknowledge that an instruction has been completed. However, each device sending a response message 160 to the gateway 124 in response to a broadcast message 172 has been found to cause many simultaneous or near simultaneous messages 160 to be directed to the gateway 124 (coordinator), resulting in messages from some particular devices being lost. The net result is that the gateway (coordinator) may not be informed of the correct state of a particular lighting device 126. The overhead of additional computing and message traffic to handle this problem can be significant; therefore, a different solution other than follow-on messages from the coordinator to devices not sending an acknowledgement was sought by the inventors of this present disclosure.

In one embodiment of the present disclosure (see FIG. 3), each device 126 is assigned a different preset time delay 127 (such as during commissioning or using directed messages 170) to wait before sending an acknowledgement 160 back to the gateway. This time delay 127 offsets the multiple responses and insures the acknowledgements 160 sent from the multiple devices 126 to the gateway 124 are staggered and, therefore, not missed by the gateway 124. For example, in a mesh network having 10 devices, each device can be assigned a specific delay, e.g., 0.00 seconds, 0.02 seconds, . . . , 0.18 seconds, one time delay 127 for each device 126.

One disadvantage of using a number of different delay times 127 equal to the number of devices 126 is that the delay time in a large lighting control network with many devices 126, for example, 200 lighting devices, can be too long of a time to be acceptable.

Some embodiments address the issue of having a large delay time by assigning to each device 126, either randomly or on a preset basis, one of a limited number of preset delay times 127. For example, in a network of 200 lighting devices, it may be sufficient to limit the number of preset delay times 127 to some fraction of that total number, for example, 20. In this example, by limiting the number of possible simultaneous or near simultaneous messages 160 sent from devices 126 to the gateway 124 to 10 (200/20), and because the path from anyone device through the mesh network 128 to the gateway 124 is likely different, there will be a low likelihood of a message 160 being missed because two or more arrive at the gateway 124 simultaneously. In this example embodiment, the total number of time delays is ten (10) percent the total number of devices. In other embodiments, the total number of time delays can be five (5) percent, twenty (20) percent, or another appropriate percentage. The number of delay times may vary based on the particular installation size and/or arrangement. In some embodiments, the delay times may be divided by a maximum number allowed per group. For example, in some embodiments a maximum number of 10 devices are allowed to have the same delay time (which may be limited by the buffer size of the gateway), so for a network of 200 devices there would be 20 different time delays. However, in another embodiment a maximum number of 20 devices are allowed to have the same delay time, so for the 200 device network there would be 10 different time delays. As can be seen from the prior examples, the total number of time delays can be varied according to the size and arrangement of the mesh network, smaller networks typically requiring fewer number of time delays than larger networks. Advantages are also realized by maintaining the maximum time delay to as small of a time delay is possible, and with smaller networks the maximum time delay would typically be shorter than the maximum time delay for larger networks.

The particular delay time 127 for a particular device response can be assigned, determined, or selected in different ways. In one embodiment, a fixed delay time 127 is individually assigned to at least one device 126, such as during commissioning of device 126 or by a message (e.g., a directed message 170 or a broadcast message 172) updating the delay time 127 for the device 126.

In an alternate embodiment, a plurality of possible delay times 127 are transmitted to at least one device 126, such as during commissioning of device 126 or by a message (e.g., a directed message 170 or a broadcast message 172) updating the plurality of possible delay times 127 for the device 126. In this embodiment, device 126 selects (or is assigned) one of the plurality of possible delay times, such as by selecting a delay time 126 associated with a particular location in the plurality, for example the sixth listed (or other number in the order) delay time. After the particular delay time is selected (or assigned), device 126 can maintain the same delay time. If an updated plurality of possible delay times 127 is later transmitted, such as by the gateway 124, device 126 can: ignore the update, update its delay time by randomly selecting a delay time from the updated plurality, or select a delay time 126 associated with the same location in the updated plurality (for example, by selecting the sixth listed delay time in the updated plurality of delay times).

In some embodiments, the delay time 127 may differ for a particular device 126 for each broadcast message 172 (or directed message 170) received. In other embodiments, the same delay 127 time will be used for a particular device 126 for every broadcast message 172 (or directed message 170) received.

Turning to FIG. 4, an optional feature in the present lighting control system 110 is referred to as multicast. In some cases it is desirable to send the same instruction to many lighting devices 126, but not all lighting devices 126 in the network 128. What has been discovered is that separate messages sent to many devices 126 may cause an undesirable latency of the lighting control system 110. For example, if a single control is used to dim a large number of lighting fixtures (or banks of lighting fixtures) that have separate lighting control devices 126 in the network 128, the time delay between various lights causes a perceivable and undesirable mismatch or delay in the dimming of the various lighting fixtures, making it difficult for the user to select the desired dim level of the lights.

To address this problem, one embodiment uses a broadcast message 172 with a bitmap designating which individual devices 126 the message is intended for, which may be referred to as a multicast message. All devices in the mesh network 128 will receive such a multicast message, and each device will typically have a unique identifier and be capable of decoding the bitmap to determine if the bitmap was intended for each device. Upon receipt each individual device 126 will decode the bitmap using, for example, decoding module 129, and determine whether or not the message should be ignored or acted upon by that device 126. In that way numerous devices 126 can near simultaneously receive and appropriately act upon or ignore the same message, greatly reducing the undesirable latency when separate messages must be sent to each device.

Elements depicted in FIGS. 2-4 with reference numerals similar to or the same as those depicted in FIG. 1, function similar to or the same as the elements in the other figure(s) except as shown and/or described.

Various Aspects of Different Embodiments of the Present Disclosure are Expressed in Paragraphs X1, or X2 as Follows:

X1. One embodiment of the present disclosure includes a lighting control system, comprising: a plurality of devices forming a wireless mesh network, each of the plurality of devices controlling at least one lighting fixture, and each of the plurality of devices configured as a repeater or an end-device; and a gateway configured to operate as a coordinator of the wireless mesh network, the gateway further configured to send a message to the plurality of devices, and wherein each plurality of devices: receives the message, delays for a period of time after receiving the message, and sends a response message to the gateway after delaying for the period of time.

X2. Another embodiment of the present disclosure includes a method, comprising: transmitting a message from a network coordinator to a plurality of devices in a wireless network with information related to time delays for devices responding to messages from the network coordinator; receiving the message from a mesh network coordinator with one or more of the plurality of devices; determining the individual time delay from the time delays for each of the one or more of the plurality of devices; transmitting a lighting command from the mesh network coordinator; receiving the lighting command from the mesh network coordinator with the one or more of the plurality of devices; and transmitting a response message from each of the one or more of the plurality of devices after waiting a time period equal to the individual time delay for each of the plurality of devices.

Yet other embodiments include the features described in any of the previous statements X1, or X2, as combined with
  (i) one or more of the previous statements X1, or X2,
  (ii) one or more of the following aspects, or
  (iii) one or more of the previous statements X1, or X2 and one or more of the following aspects:

Wherein each plurality of devices receives the message, delays for a period of time equal to one of a predetermined set of delay times after receiving the message, and sends a response message to the gateway after delaying for the period of time.

Wherein the gateway communicates the predetermined set of time delays to the devices in the network.

Wherein the gateway communicates the predetermined set of time delays to the devices in the network during the commissioning process.

Wherein the gateway communicates the predetermined set of time delays to the devices in the network after the commissioning process.

Wherein the gateway communicates the predetermined set of time delays to the devices with a directed message to one or more specific devices.

Wherein the gateway communicates the predetermined set of time delays to the devices with a broadcast message to all devices in the network.

Wherein the number of delay times comprising the predetermined set of delay times is less than the number of devices comprising the plurality of devices.

Wherein the number of delay times comprising the predetermined set of delay times is ten (10) percent of the number of devices forming the wireless mesh network.

Wherein the delay time is preset for each of the plurality of devices.

Wherein the delay times for each of the plurality of devices are randomly selected from the predetermined set of delay times.

Wherein the broadcast message includes a bitmap designating which of the plurality of devices are to respond and which of the plurality of devices are to not respond to the broadcast message.

Transmitting a message from a network coordinator to a plurality of devices in a wireless network with information related to a predetermined number of time delays for devices responding to messages from the network coordinator; receiving the message from a mesh network coordinator with one or more of the plurality of devices; determining the individual time delay from the predetermined number of time delays for each of the one or more of the plurality of devices.

Wherein said transmitting a message includes transmitting a predetermined number of time delays equal to less than the total number of devices in the wireless network.

Wherein said transmitting a message includes transmitting a predetermined number of time delays equal to ten (10) percent of the total number of devices in the wireless network.

Wherein said receiving the message from a mesh network coordinator occurs during the commissioning of each of the one or more devices in the wireless network.

Wherein said receiving the message from a mesh network coordinator occurs after the commissioning of each of the one or more devices in the wireless network.

Wherein said transmitting a message includes transmitting a message with a bitmap identifying less than the total number of devices in the wireless network, and wherein said receiving the message includes determining by each of the one or more devices whether the bitmap identifies the device receiving the message.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A lighting control system, comprising:
  a plurality of devices forming a wireless mesh network, each of the plurality of devices controlling at least one lighting fixture, and each of the plurality of devices configured as a repeater or an end-device; and
  a gateway configured to operate as a coordinator of the wireless mesh network, the gateway further configured to send a message to the plurality of devices, and wherein each plurality of devices:
  receives the message,
    delays for a period of time equal to one of a predetermined set of delay times after receiving the message, and
  sends a response message to the gateway after delaying for the period of time.

2. The lighting control system of claim 1, wherein the gateway communicates the predetermined set of time delays to the devices in the network.

3. The lighting control system of claim 2, wherein the gateway communicates the predetermined set of time delays to the devices in the network during the commissioning process.

4. The lighting control system of claim 2, wherein the gateway communicates the predetermined set of time delays to the devices in the network after the commissioning process.

5. The lighting control system of claim 4, wherein the gateway communicates the predetermined set of time delays to the devices with a directed message to one or more specific devices.

6. The lighting control system of claim 4, wherein the gateway communicates the predetermined set of time delays to the devices with a broadcast message to all devices in the network.

7. The lighting control system of claim 1, wherein the number of delay times comprising the predetermined set of delay times is less than the number of devices comprising the plurality of devices.

8. The lighting control system of claim 7, wherein the number of delay times comprising the predetermined set of delay times is ten (10) percent of the number of devices forming the wireless mesh network.

9. The lighting control system of claim 7, wherein the delay time is preset for each of the plurality of devices.

10. The lighting control system of claim 7, wherein the delay times for each of the plurality of devices are randomly selected from the predetermined set of delay times.

11. The lighting control system of claim 1, wherein the message includes a bitmap designating which of the plurality of devices are to respond and which of the plurality of devices are to not respond to the message.

12. A method, comprising:
  transmitting a message from a network coordinator to a plurality of devices in a wireless network with information related to a predetermined number of time delays for devices responding to messages from the network coordinator;
  receiving the message from a mesh network coordinator with one or more of the plurality of devices;
  determining the individual time delay from the predetermined number of time delays for each of the one or more of the plurality of devices;
  transmitting a lighting command from the mesh network coordinator;
  receiving the lighting command from the mesh network coordinator with the one or more of the plurality of devices; and
  transmitting a response message from each of the one or more of the plurality of devices after waiting a time period equal to the individual time delay for each of the plurality of devices.

13. The method of claim 12, wherein said transmitting a message includes transmitting a predetermined number of time delays equal to less than the total number of devices in the wireless network.

14. The method of claim 13, wherein said transmitting a message includes transmitting a predetermined number of time delays equal to ten (10) percent of the total number of devices in the wireless network.

15. The method of claim 12, wherein said receiving the message from a mesh network coordinator occurs during the commissioning of each of the one or more devices in the wireless network.

16. The method of claim 12, wherein said receiving the message from a mesh network coordinator occurs after the commissioning of each of the one or more devices in the wireless network.

17. The method of claim 12, wherein said transmitting a message includes transmitting a message with a bitmap identifying less than the total number of devices in the wireless network, and wherein said receiving the message includes determining by each of the one or more devices whether the bitmap identifies the device receiving the message.

18. The method of claim 12, wherein the message is a broadcast message to all devices in the network.

19. The method of claim 12, wherein the message is a directed message to one or more specific devices.

* * * * *